Feb. 12, 1946.   P. W. WEST   2,394,647
PROCESS OF MAKING ICE
Filed Nov. 6, 1942
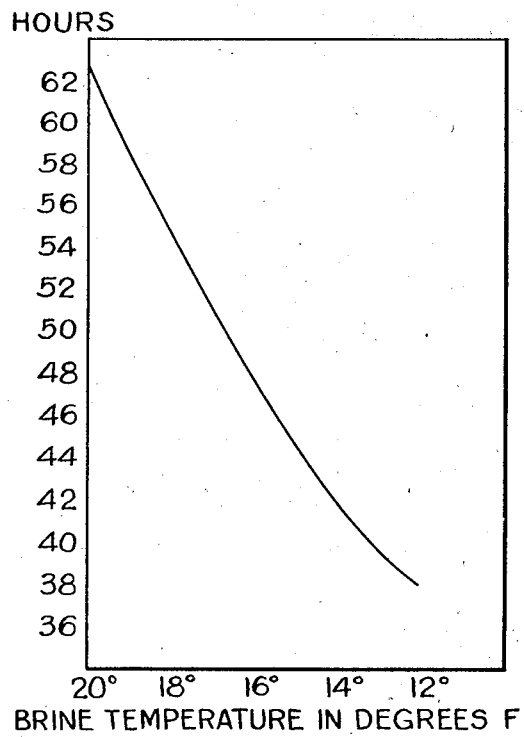
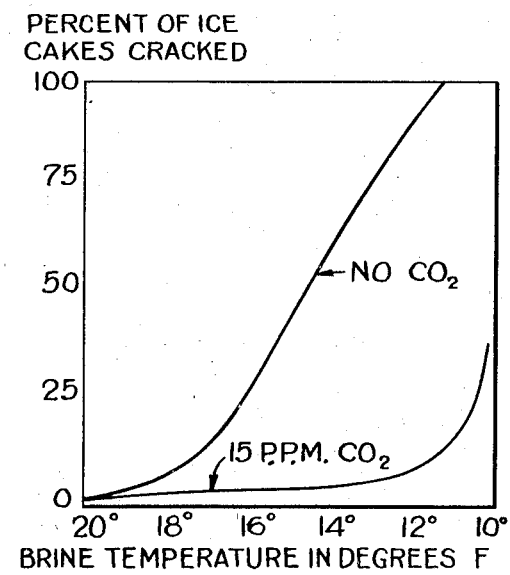
INVENTOR
*Philip W. West*
BY
ATTORNEYS Patented Feb. 12, 1946

2,394,647

UNITED STATES PATENT OFFICE 2,394,647

PROCESS OF MAKING ICE

Philip W. West, Baton Rouge, La., assignor to Board of Supervisors of Louisiana State University and Agricultural and Mechanical College, Baton Rouge, La.

Application November 6, 1942, Serial No. 464,710

4 Claims. (Cl. 62—172)

The main object of the present invention is to provide a process whereby the advantages of freezing water at very low temperatures may be obtained and a product produced which is substantially free of the shattering characteristics of ice frozen at such low temperature in ordinary commercial apparatus.

A problem which has long confronted the ice industry is the tendency for certain manufactured ices to crack and shatter when frozen at low temperatures. Since the capacity of any given plant is greatly increased by maintaining the lowest freezing temperatures practicable, it is of considerable economic interest that good ice be frozen at low temperatures.

The production of manufactured ice is usually carried out by submerging cans, containing 300 pounds of water, in brines held at temperatures of 12° to 20° F. The ultimate aim of each manufacturer is to use the lowest brine temperature consistent with the production of marketable ice.

In the accompanying drawing:

Fig. 1 is a graph showing the effect of brine temperature on the time required for freezing a 300 pound cake, and Fig. 2 is a graph showing the effect of carbon dioxide content of the water on the percentage of cakes cracked.

The desirability of low freezing temperatures is obvious from the relationship between freezing time and temperature. Lowering the freezing time greatly increases the capacity of a plant of any given size. Typical plant data showing the effect of temperature on freezing time is shown in Figure 1 of the accompanying drawing. It will be noted that at a temperature of 20° F. the time required for freezing a normal 300 pound block of ice is about 62 hours, whereas at 13° F. the freezing time is reduced to about 40 hours.

Unfortunately, the use of low brine temperature leads to the formation of opaque ice, white butts, and other operational difficulties when the more highly mineralized waters are frozen. In addition to the formation of opaque ice, decrease in brine temperatures increases the tendency of the frozen blocks of ice to crack or shatter upon their removal from the brine tank. In general, the experienced chemist or engineer can predict from analyses of the water concerned whether or not transparent ice can be expected under normal operating conditions. When slight opacities are encountered they can often be corrected by lime softening, treatment with alum, conversion of bicarbonates to chlorides or sulfates by means of acids, or increasing the air pressure so as to insure more complete agitation of the water being frozen.

In the case of cracking and shattering, however, it has often been impossible to predict the characteristics of ice frozen from different waters at low temperatures. Furthermore, when cracking is encountered it is often extremely difficult to prevent. This is a serious handicap to the ice industry because of the importance of solid ice in the subsequent handling of the blocks after their removal from the freezing cans. Most plants must store their ice for some hours before it can be sold on the platform or route. During the handling of the blocks from the time they are removed from the cans, through storage, scoring, and delivery, they usually pass through many manually conducted operations. Handling of blocks which are weakened by cracks constitutes an industrial hazard to the workers. In addition to physical hazards to ice handlers, cracked ice constitutes an economic loss because of the difficulty of scoring and reducing the size of the large blocks to the smaller sized cakes called for by the trade.

The problem of producing non-shattering ice at low temperatures has been studied by many investigators, and many theories have been advanced, but so far as I am advised, the problem has not been solved. Factors which have been stated as influencing cracking are the presence of bicarbonate ions, neutralization of lime treated waters by addition of aluminum sulfate, addition of ammonium chloride, excess of lime, use of sodium aluminate or alum, the pH of the water, and controlled annealing after freezing. There are many apparent contradictions in the conclusions of previous investigators, some of which may be explained on the logical theory that there are probably a number of causes of cracking, and a given treatment which may be advantageous with one water may aggravate the trouble when used with another type of water.

It should be noted, however, that where chemical composition of the "raw" water is considered as the source of cracking, carbonates and bicarbonates, especially those of calcium and magnesium, are usually blamed. Consequently, standard procedure for the elimination of cracking calls for softening of the water before freezing, conversion of carbonates to sulfates by alum or sulfuric acid, or for addition of various "anticrack" compounds of the ammonium chloride type. In those cases where cracking occurs with waters which are only slightly mineralized, standard treatments usually fail. The following investigation deals with the causes and methods of preventing cracking in these latter cases.

In spite of all of the theories regarding the deleterious effect of carbonates and bicarbonates in the water to be frozen, I have discovered that shattering of the ice frozen at low temperatures may be substantially prevented by bubbling carbon dioxide through the water either prior to or during the low temperature freezing.

The carbon dioxide gas may be added to the air that is normally bubbled through the water in the can during freezing instead of being bubbled into the water in the storage tank or in the dosing tank. The amount of carbon dioxide employed will vary with different waters employed and is determined by the amount of carbonate or hydroxide alkalinity in the water to be frozen. Enough should be added to give a residual free carbon dioxide content of at least 15 parts per million.

Free carbon dioxide is quite soluble in water and the solubility increases with decrease in temperature, and to avoid any warming effect of carbon dioxide gas at room temperature it is practical in my process to feed liquid carbon dioxide through a reducing valve directly into various parts of the system. Results obtained indicate that the point of carbonation is relatively unimportant, although slightly better results have been obtained when carbonation was carried out at the water storage tank.

Although carbonation in some cases lowered the pH of the water from an original value of 9.3 to values of from 7.2 to 8.5, it has been established that such lowering of the pH was not the main factor in reducing the amount of cracking. It has also been established that waters having low total dissolved solids are capable of causing cracking problems when used for the manufacture of ice. In such cases the usual methods heretofore proposed for eliminating cracking often fail.

No special equipment is needed for utilizing my improved process, and the cost is very low, particularly when it is realized that the process makes possible an increase of up to 30% in the production of ice, due to the fact that it makes feasible the use of lower freezing temperatures.

The advantages as recorded in a series of tests are set forth in the following table. Where carbon dioxide was used, the concentration of carbon dioxide in the water was adjusted to between 15 and 35 parts per million for the start of the freeze. The cracks occurring in the ice where carbon dioxide was used were due largely to slightly bent drop tubes.

*The effect of carbon dioxide on the cracking of ice*

| Brine temperature, degrees F. | | | Treatment | Per cent cracked |
|---|---|---|---|---|
| Start | Mid-freeze | Pull | | |
| 16 | 16 | 16 | No CO₂ used. Blocks tempered 15 min | 28 |
| 16 | 16 | 16 | CO₂ fed at dosing tank. Blocks tempered 15 min | 17 |
| 16 | 15 | 15 | CO₂ fed at storage tank. Blocks tempered 15 min | 3.5 |
| 16 | 15 | 15 | CO₂ fed through air line. CO₂ in air 0.5–1.0 per cent. Blocks tempered 15 min | 4.0 |

Obviously in the commercial process of freezing water in cans as heretofore practiced, the shattering of the product is negligible when brine temperatures of only a little below 32° F. or even down to 20° F. are employed. The rapid increase in the rate of freezing and in daily output of the plant are obtained when brine temperatures below 20° F. are employed, but it is at the lower temperatures where shattering of the product becomes increasingly serious. The advantages of my improved process will be apparent from Figure 2 of the accompanying drawing, and in which the two curves are plotted for brine temperatures of 20° F. to 10° F. and the percentage of cake which cracked, using no carbon dioxide and using 15 or more parts of carbon dioxide per million parts of water. From this figure it will be seen that when the water is substantially free of carbon dioxide the percentage of frozen cakes which cracked after the freezing and after raise in temperature was substantially greater for successively lower brine temperatures. When the water contained 15 parts per million of carbon dioxide the percentage of cakes which cracked was very small when the temperature of the brine employed in effecting the freezing was above 12%.

Although it is customary to temper the ice cake for about 15 minutes after freezing, such tempering is not essential when my process is employed, and thus a further saving in time of production may be obtained. Where lime has been used to soften the raw water my process makes possible the softening to the minimum concentration of calcium and magnesium, and the carbon dioxide introduced may convert the lime and magnesia to the bicarbonate and prevent it from precipitating in the core of the cake. Thus the necessity of sucking from the core of the cake water containing a concentration of impurities and replacing it with fresh water in the midst of the freezing, is reduced or even eliminated.

Having thus described my invention, what I claim as new and desire to secure by Letters Patent is:

1. The process of substantially reducing the liability of shattering of manufactured ice cakes and decreasing the time of freezing, which includes bubbling carbon dioxide gas through the water to be frozen before introducing it into the freezing can, and in sufficient amount to give a residual free carbon dioxide content of at least 15 parts per million, and freezing the water at atmospheric pressure and by the action of a refrigerant having a temperature of not higher than 20° F.

2. The process of manufacturing ice cakes substantially free of liability of shattering upon rise in temperature after freezing, and increasing the speed of freezing, which comprises imparting to the water to be frozen a free carbon dioxide content of at least 15 parts per million, and freezing the water at atmospheric pressure and at a temperature which would, in the absence of said carbon dioxide, produce cakes a substantial portion of which would shatter upon raising the temperature of the frozen cakes.

3. The process of manufacturing ice cakes substantially free of liability of shattering upon rise in temperature after freezing, and increasing the speed of freezing, which comprises imparting to the water to be frozen, before introducing it into the freezing can, a free carbon dioxide content of at least 15 parts per million, and freezing the water at atmospheric pressure and at a temperature which would, in the absence of said carbon dioxide, produce cakes a substantial percentage of which would shatter upon raising the temperature of the frozen cakes.

4. The process of manufacturing ice cakes substantially free of liability of shattering upon rise in temperature after freezing, and increasing the speed of freezing, which comprises imparting to the water to be frozen, during the freezing operation, a free carbon dioxide content of at least 15 parts per million, and freezing the water at atmospheric pressure and at a temperature which would, in the absence of said carbon dioxide, produce cakes a substantial percentage of which would shatter upon raising the temperature of the frozen cakes.

PHILIP W. WEST.